Sept. 21, 1943.  L. H. MORIN  2,330,001
OPEN SIDE SEPARABLE FASTENER
Filed May 23, 1942
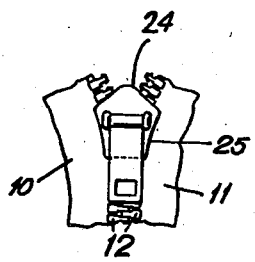
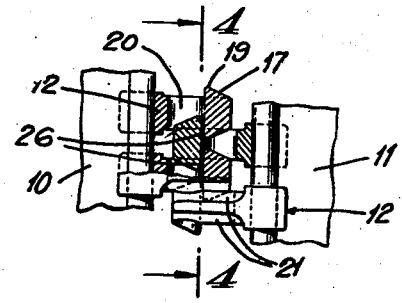
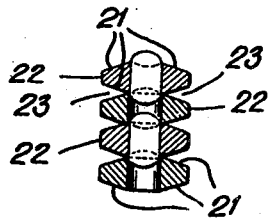
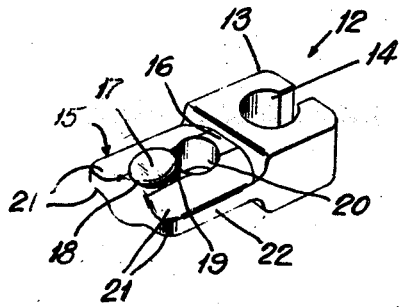
INVENTOR
LOUIS H. MORIN
BY
ATTORNEYS Patented Sept. 21, 1943

2,330,001

UNITED STATES PATENT OFFICE 2,330,001

OPEN SIDE SEPARABLE FASTENER

Louis H. Morin, Bronx, N. Y., assignor of one-half to Davis Marinsky, Bronx, N. Y.

Application May 23, 1942, Serial No. 444,190

9 Claims. (Cl. 24—205)

This invention relates to separable fasteners employing stringers adapted to be coupled and uncoupled by a slider movable along the stringers. More particularly, the invention relates to stringers employing double acting scoops, that is to say, scoops having similar interlocking elements on opposed surfaces thereof, and still further to scoops of this type and kind having contracted side walls producing, on the resulting fastener, openings extending longitudinally of the coupled stringers, which prevent congestion or clogging of the stringers, and further, facilitate free removal of any foreign particles, which may collect therein. The novel features of the invention will be best understood from the following description when taken together with the accompanying drawing, in which certain embodiments of the invention are disclosed, and in which the separate parts are designated by suitable reference characters in each of the views; and in which:

Fig. 1 is a face view of the part of a fastener made according to my invention showing the slider thereon.

Fig. 2 is an enlarged detail side and sectional view of a portion of two coupled stringers.

Fig. 3 is a perspective view of one link or scoop detached, and

Fig. 4 is a partial section on the line 4—4 of Fig. 2.

In the construction of separable fastener stringers of the kind under consideration, it has been the common practice to employ links or scoops having relatively flat side surfaces throughout the major portion of the width of the links or scoops, thus presenting, on the resulting coupled stringers, a relatively smooth and flat surface with small crevices or openings distributed thereover. In the use of fasteners of this type and kind, particularly where they are subjected to, or come in contact with, mud, dirt and similar foreign matter or particles, the smaller crevices or openings become clogged and congested and difficulty is experienced in freeing or removing these particles in restoring the fastener to proper use. It is one of the features of my invention to so construct the links or scoops of the fastener as to provide, on both side surfaces of the resulting fastener and between adjacent coupled links, large V-shaped channels or openings, which will facilitate the free discharge of particles from the fastener and further minimize congestion of particles coming between the links or scoops of the fastener by materially reducing the surface contacting areas between adjacent links or scoops. Still further, it is a feature of my invention to provide a double acting link or scoop, that is to say, one having similar opposed surfaces with the male coupling element arranged at the outer extremity of the link or scoop and the female socket or aperture portion inwardly of said element, and further in so shaping the resulting coupling elements as to provide relatively long overlapping, contacting areas between the elements of adjacent coupled scoops.

In Figs. 1 and 2 of the drawing, 10 and 11 represent portions of two stringers, to one edge of which are secured links or scoops 12. As these links or scoops are of identical construction on both stringers, a brief description of one will apply to all.

In Fig. 3 of the drawing, a perspective view of one link or scoop is shown in detached relation with respect to the tape or mounting. The scoop comprises a mounting end 13 shaped to form a fork or yoke 14, which is attached to the stringer tape, and at 15 is shown the coupling end.

In the construction shown, the central longitudinal portion 16 of the coupling end is slightly less in width than the mounting end 13 and on this central portion 14, near the outer extremity of said end, is formed upwardly and downwardly projecting members or elements 17. These elements are bevelled so that their outer ends 18 are substantially flush with the surface 16 and their inner ends 19 protrude well above the surface 16 to enter apertures 20 in the links or scoops of an opposed scoop, as clearly indicated in Fig. 2 of the drawing. The aperture 20 in each link opens through both surfaces 16 and is arranged directly inwardly of the elements 17.

From the surface 16, the upper and lower surfaces of the link or scoop are bevelled or contracted, as seen at 21, to form centrally of the side surfaces of the link or scoop relatively narrow surfaces 22, note Fig. 4. The bevelled surfaces 21 form at opposite sides of coupled stringers and between adjacent links or scoops thereof widely flaring recesses or openings 23. In other words, the actual normal contacting areas of adjacent links are the areas of the surfaces 16, which represent a small part of the entire surface area of the links. In addition, to minimizing the collection of foreign particles, this construction will also provide for free disengagement of particles, which may collect in the fastener by shaping or other agitation. The bevelled surfaces 21 also provide free rocking movement of the adjacent coupled links or scoops one upon the other, which results in the production of an extremely flexible fastener, which will adapt itself for use where the fastener is subjected to flexures or bending, especially as used on various types and kinds of apparel. The side open feature of a fastener made according to my invention adapts fasteners of this kind for use on leggings where they are susceptible to contact with mud, dirt, snow and other particles which might operate to otherwise clog or congest a fastener to render the same inoperative.

The double acting characteristics of my improved link or scoop structure adapts the fastener for use with sliders operating in what might be termed a universal manner on the stringers, that is to say, with the wide end 24 of a slider 25 extending in the direction of either end of the stringers; further, two or more sliders can operate on one fastener.

Upon a consideration of Fig. 2 of the drawing, it will appear that when the links or scoops of the stringers are coupled, the inner protruding ends 19 of the elements 17 extend well into the apertures of adjacent links or scoops and the corresponding members of said adjacent links or scoops extend into the aperture of the first mentioned link or scoop. This produces the wide overlapping engaging surfaces 26, which clearly appear in the figure. The outward bevelling of the member 17 facilitates a more free coupling engagement between the links. However, it will be apparent that, in some instances, simply rounded pins can be employed instead of the flattened pins shown, as these rounded pins will operate substantially in the same manner.

With the present link or scoop construction, the projections 17 and sockets 20 provide the sole means of coupling the links or scoops against displacement.

Having fully described my invention, what I claim as new and desire to secure by Letters Patent, is:

1. A separable fastener employing stringers coupled and uncoupled by a slider movable along the stringers, each stringer having links spaced longitudinally of one edge thereof, each of said links having similar side surfaces with male and female coupling portions arranged centrally and spaced longitudinally of said surfaces, and the male portions of one link engaging the female portions of adjacent links of an opposed stringer in coupling said stringers together.

2. A separable fastener employing stringers coupled and uncoupled by a slider movable along the stringers, each stringer having links spaced longitudinally of one edge thereof, each of said links having similar side surfaces with male and female coupling portions arranged centrally and spaced longitudinally of said surfaces, the male portions of one link engaging the female portions of adjacent links of an opposed stringer in coupling said stringers together, and said surfaces being contracted in the direction of opposed sides of the link to form between adjacent coupled links large outwardly flaring openings.

3. A separable fastener employing stringers coupled and uncoupled by a slider movable along the stringers, each stringer having links spaced longitudinally of one edge thereof, each of said links having similar side surfaces with male and female coupling portions arranged centrally and spaced longitudinally of said surfaces, the male portions of one link engaging the female portions of adjacent links of an opposed stringer in coupling said stringers together, and inner ends of the male coupling portions protruding beyond the surface of the link a greater degree than the outer ends thereof.

4. In separable fasteners employing stringers having interengaging links on adjacent edges thereof, means interlocking the links to prevent displacement thereof when coupled together, and means on the links forming on opposite surfaces thereof large openings between adjacent links.

5. In separable fasteners employing stringers having interengaging links on adjacent edges thereof, means interlocking the links to prevent displacement thereof when coupled together, means on the links forming on opposite surfaces thereof large openings between adjacent links, and said openings being defined by diverging opposed walls on adjacent coupled links.

6. In separable fasteners employing stringers having interengaging links on adjacent edges thereof, means interlocking the links to prevent displacement thereof when coupled together, means on the links forming on opposite surfaces thereof large openings between adjacent links, said openings being defined by diverging opposed walls on adjacent coupled links, and said openings extending the full length of the overlapping portions of the coupled links and providing rocking of the links in the direction of either side surface of the coupled stringers.

7. A scoop for separable fasteners, said scoop comprising a body portion having a yoke-shaped mounting end and a coupling end, the coupling end having coupling elements on opposed surfaces thereof inwardly of the sides of said body, and said opposed surfaces at each side of the body having contracted walls extending throughout the full length of the coupling end portion, producing at the sides of said body a narrow central fin.

8. A scoop for separable fasteners, said scoop comprising a body portion having a yoke-shaped mounting end and a coupling end, the coupling end having coupling elements on opposed surfaces thereof inwardly of the sides of said body, said opposed surfaces at each side of the body having contracted walls extending throughout the full length of the coupling end portion, producing at the sides of said body a narrow central fin, said coupling elements comprising projecting pin members at the outer end of said coupling end portion, and an aperture at the inner end thereof opening through both of said surfaces.

9. A separable fastener employing stringers coupled and uncoupled by a slider movable along the stringers, each stringer having links spaced longitudinally of one edge thereof, each of said links having substantially the same structure and comprising a body portion having a mounting end and a coupling end, the coupling end having similar opposed side surfaces, an outer end, a central longitudinal fin part and bevelled walls extending throughout the full length of the coupling end portion and forming between adjacent coupled links outwardly flaring openings, each of said opposed side surfaces being provided at said central longitudinal fin part with a male coupling pin having an outer end substantially flush with the side surface of the link and the surface of the outer end thereof, the inner end of said pin protruding above said side surface and each of said opposed side surfaces also being provided at said central longitudinal fin part and adjacent said pin with socket means cooperating with said pin in coupling and uncoupling said links.

LOUIS H. MORIN.